United States Patent
Tachibana et al.

(10) Patent No.: US 10,351,667 B2
(45) Date of Patent: Jul. 16, 2019

(54) METHOD FOR PRODUCING POLYESTER

(71) Applicant: RIKEN, Saitama (JP)

(72) Inventors: Koichiro Tachibana, Saitama (JP); Hideki Abe, Saitama (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 15/573,202

(22) PCT Filed: May 11, 2016

(86) PCT No.: PCT/JP2016/063984
§ 371 (c)(1),
(2) Date: Nov. 10, 2017

(87) PCT Pub. No.: WO2016/181988
PCT Pub. Date: Nov. 17, 2016

(65) Prior Publication Data
US 2018/0086879 A1 Mar. 29, 2018

(30) Foreign Application Priority Data
May 11, 2015 (JP) .................................. 2015-096262

(51) Int. Cl.
*C08G 63/06* (2006.01)
*C08G 63/86* (2006.01)
*C08G 63/85* (2006.01)

(52) U.S. Cl.
CPC .......... *C08G 63/866* (2013.01); *C08G 63/06* (2013.01); *C08G 63/85* (2013.01)

(58) Field of Classification Search
USPC ........................ 528/207, 271, 272, 273, 274
See application file for complete search history.

(56) References Cited

FOREIGN PATENT DOCUMENTS

| JP | 2011-052129 | 3/2011 |
| JP | 2011-057748 | 3/2011 |
| JP | 2011-088994 | 5/2011 |
| JP | 2012-116913 | 6/2012 |

OTHER PUBLICATIONS

Extended European Search Report, received in corresponding European patent application No. 16792713.6, dated Sep. 25, 2018, 7 pages.
Mailon et al., Polyalkylenehydroxybenzoates (PAHBs): Biorenewable Aromatic/Aliphatic Polyesters from Lignin, Macromolecular Rapid Communications, 2011, 32, 1386-1392.

*Primary Examiner* — Terressa Boykin
(74) *Attorney, Agent, or Firm* — Duane Morris LLP; Gregory M. Lefkowitz; Jason M. Nolan

(57) ABSTRACT

Provided is a method for producing a non-colored polyester with a high molecular weight. The method is to produce a polyester represented by a general formula (2). This method comprises: a first step of heating, under the presence of an antimony catalyst, a compound represented by the general formula (1) at a heating temperature in a range of from a melting point of the compound to a temperature that is 10° C. higher than the melting point; and a second step of heating a solid product or viscous product obtained after the first step at a heating temperature in a range of from the melting point of the compound represented by the general formula (1) to 270° C.

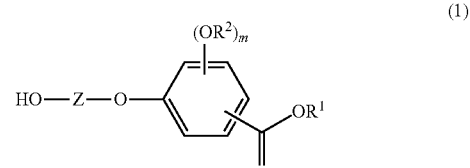

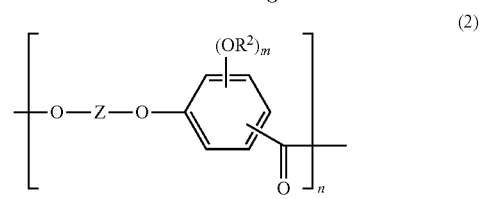

4 Claims, No Drawings

METHOD FOR PRODUCING POLYESTER

CROSS-REFERENCE TO RELATED APPLICATIONS

This application is a § 371 national stage entry of International Patent Application No. PCT/JP2016/063984, filed on May 11, 2016, which claims priority to Japanese Patent Application No. 2015-096262, filed on May 11, 2015, the entire contents of which are incorporated herein by reference.

TECHNICAL FIELD

The present invention relates to a method for producing a non-colored polyester having a high molecular weight.

BACKGROUND ART

Polyester is a polymer obtained through polycondensation of a polybasic acid and a polyalcohol. Since various types of polymers for different purposes or applications can be synthesized by combining polybasic acids and polyalcohols, these polymers can be used in various fields, such as those producing films, containers and fibers.

As a polyester superior in heat resistance and crystallinity, there has been reported a vanillic polyester as a polymer of an aromatic hydroxycarboxylic acid, especially as a polymer of a vanillic acid which is useful as a biomass resource (Patent documents 1 and 2). Conventionally, titanium catalysts have been used as polymerization catalysts for obtaining a vanillic polyester through polymerization. There has been a problem that a vanillic polyester obtained using a titanium catalyst is already colored in brown, which creates a hindrance to coloring under various intended purposes.

Meanwhile, non-patent document 1 discloses a method for producing a vanillic polyester, using an antimony catalyst. In general, when a polyester is used for the aforementioned purposes such as containers, there cannot be achieved a sufficient strength unless the molecular weight of the polyester is sufficiently high, thus requiring a method for achieving a high molecular weight. However, a vanillic acid polyester with a high molecular weight cannot be obtained by the method described in the non-patent document 1. In fact, a vanillic acid polyester with a weight average molecular weight of about 5,000 is at the highest (Non-patent document 1).

PRIOR ART DOCUMENT

Patent Document

Patent document 1: JP-A-2011-057748
Patent document 2: Japanese Patent No. 5421060

Non-Patent Document

Non-patent document 1 Laurent Mialo et al, Macromolecular Rapid Communications, 2011, 32, p. 1386-1392

SUMMARY OF THE INVENTION

Problem to be Solved by the Invention

Therefore, it is an object of the present invention to find a method for producing a non-colored high-molecular-weight polyester.

Means to Solve the Problem

The inventors of the present invention diligently conducted a series of studies to solve the abovementioned problems, and then arrived at the invention as follows. That is, the inventors found that these problems could be solved by using an antimony catalyst to obtain a polyester through polymerization, and controlling a polymerization temperature.

In other words, the present invention is to provide the following invention.

<1>
A method for producing a polyester represented by general formula (2) comprising:
a first step of heating, under the presence of an antimony catalyst, a compound represented by the following general formula (1) at a heating temperature in a range of from a melting point of the compound to a temperature that is 10° C. higher than the melting point

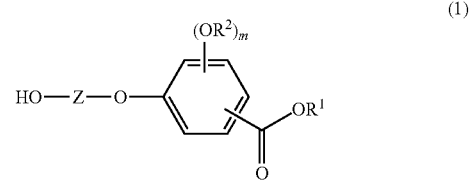

wherein Z represents a divalent hydrocarbon group having 1 to 12 carbon atoms; $R^1$ represents a hydrogen atom, an alkyl group having 1 to 6 carbon atoms, or a phenyl group; $R^2$ represents a methyl group or an ethyl group; and m represents an integer of 0 to 2; and a second step of heating a solid product or viscous product obtained after the first step at a heating temperature in a range of from the melting point of the compound represented by the general formula (1) to 270° C., and
wherein in the following general formula (2)

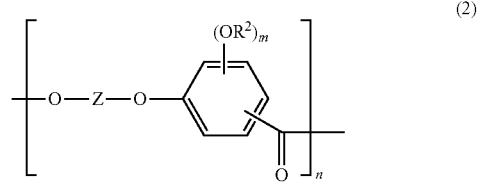

Z, $R^2$ and m are defined as above in the general formula (1); and n represents an average repeating unit number satisfying n=10 to 600.
<2>
The method for producing the polyester according to <1>, wherein Z in the general formula (1) is an alkylene group represented by $(CH_2)_p$, wherein p represents 3 or 4.
<3>
The method for producing the polyester according to <2>, wherein the heating temperature in the second step is 140 to 220° C.
<4>
A polyester obtained by the method described in any one of the <1> to <3>.

Effects of the Invention

According to the present invention, there can be obtained a non-colored polyester having a high molecular weight.

Since the polyester obtained through the production method of the invention has a high molecular weight, the polyester is superior in heat resistance for having a high glass-transition temperature and a high decomposition temperature, and is also superior in mechanical property such as tensile strength. Further, since the polyester obtained is non-colored, it can be used for various purposes.

MODE FOR CARRYING OUT THE INVENTION

The present invention is described in detail hereunder.
Method for Producing Polyester
A compound used as a monomer in the present invention is represented by the following general formula (1).

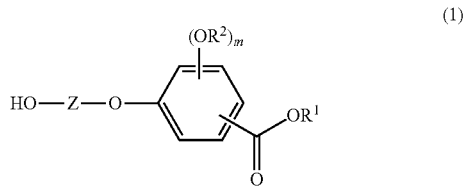

[In the general formula (1), Z represents a divalent hydrocarbon group having 1 to 12 carbon atoms; $R^1$ represents a hydrogen atom, an alkyl group having 1 to 6 carbon atoms, or a phenyl group; $R^2$ represents a methyl group or an ethyl group; and m represents an integer of 0 to 2.]

In the general formula (1), it is more preferred that the divalent hydrocarbon group having 1 to 12 carbon atoms as represented by Z have 2 to 8 carbon atoms. Specific examples of such divalent hydrocarbon group include an alkylene group, an alkenylene group, an arylene group and an alkylenearylene group. These groups may be either linear or branched. Further, a part of or all the hydrogen atoms bonded to the carbon atoms in any of these groups may be substituted by, for example, halogen atoms such as fluorine atoms.

Particularly, it is preferred that the divalent hydrocarbon group represented by Z be an alkylene group represented by $—(CH_2)_p—$. Here, p represents an integer of 2 to 8, and it is especially preferred that p represent either 3 or 4.

In the general formula (1), $R^1$ represents a hydrogen atom, an alkyl group having 1 to 6 carbon atoms, or a phenyl group. Examples of such alkyl group having 1 to 6 carbon atoms include a methyl group, an ethyl group, a propyl group, an isopropyl group, an n-butyl group, an isobutyl group, an s-butyl group, a t-butyl group, a pentyl group and a hexyl group. It is especially preferred that $R^1$ represent a hydrogen atom.

In the general formula (1), although $R^2$ represents either a methyl group or an ethyl group, it is preferred that $R^2$ be a methyl group. When m=2, the two $R^2$s may be either identical to or different from each other.

Here, with regard to the compound used as a monomer in the present invention, it is preferred that, when m=1, one $(OR^2)$ group exist in an ortho position with respect to the group represented by HO—Z—O—, and a $(COOR^1)$ group exist in the para position with respect to the group represented by HO—Z—O—.

Further, it is preferred that, when m=2, two $(OR^2)$ groups both exist in the ortho positions with respect to the group represented by HO—Z—O—, and the $(COOR^1)$ group exist in the para position with respect to the group represented by HO—Z—O—.

Specific examples of such monomer compound include:
4-(2-hydroxyethoxy) benzoic acid;
4-(3-hydroxypropoxy) benzoic acid;
4-(4-hydroxybutoxy) benzoic acid;
4-(5-hydroxyheptoxy) benzoic acid;
4-(6-hydroxyhexoxy) benzoic acid;
4-(7-hydroxyheptoxy) benzoic acid;
4-(8-hydroxyoctoxy) benzoic acid;
4-(2-hydroxyethoxy)-3-methoxy benzoic acid;
4-(3-hydroxypropoxy)-3-methoxy benzoic acid;
4-(4-hydroxybutoxy)-3-methoxy benzoic acid;
4-(5-hydroxyheptoxy)-3-methoxy benzoic acid;
4-(6-hydroxyhexoxy)-3-methoxy benzoic acid;
4-(7-hydroxyheptoxy)-3-methoxy benzoic acid;
4-(8-hydroxyoctoxy)-3-methoxy benzoic acid;
4-(2-hydroxyethoxy)-3-ethoxy benzoic acid;
4-(3-hydroxypropoxy)-3-ethoxy benzoic acid;
4-(4-hydroxybutoxy)-3-ethoxy benzoic acid;
4-(5-hydroxyheptoxy)-3-ethoxy benzoic acid;
4-(6-hydroxyhexoxy)-3-ethoxy benzoic acid;
4-(7-hydroxyheptoxy)-3-ethoxy benzoic acid;
4-(8-hydroxyoctoxy)-3-ethoxy benzoic acid;
4-(2-hydroxyethoxy)-3,5-dimethoxy benzoic acid;
4-(3-hydroxypropoxy)-3,5-dimethoxy benzoic acid;
4-(4-hydroxybutoxy)-3,5-dimethoxy benzoic acid;
4-(5-hydroxyheptoxy)-3,5-dimethoxy benzoic acid;
4-(6-hydroxyhexoxy)-3,5-dimethoxy benzoic acid;
4-(7-hydroxyheptoxy)-3,5-dimethoxy benzoic acid;
4-(8-hydroxyoctoxy)-3,5-dimethoxy benzoic acid;
4-(2-hydroxyethoxy)-3,5-diethoxy benzoic acid;
4-(3-hydroxypropoxy)-3,5-diethoxy benzoic acid;
4-(4-hydroxybutoxy)-3,5-diethoxy benzoic acid;
4-(5-hydroxyheptoxy)-3,5-diethoxy benzoic acid;
4-(6-hydroxyhexoxy)-3,5-diethoxy benzoic acid;
4-(7-hydroxyheptoxy)-3,5-diethoxy benzoic acid;
4-(8-hydroxyoctoxy)-3,5-diethoxy benzoic acid; and
alkyl esters and phenyl esters of these benzoic acids.

The compound represented by the general formula (1) can, for example, be obtained through the following method.

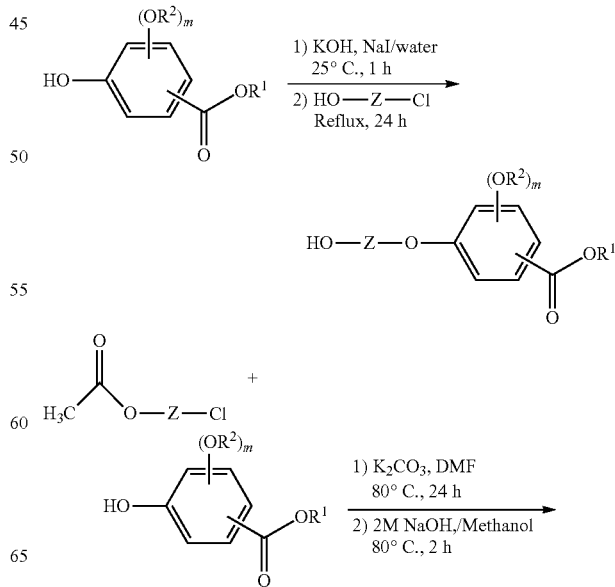

-continued

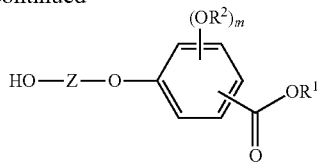

In the above formulae, Z, $R^1$, $R^2$ and m are identical to those in the formula (1).

Here, as a raw material compound, preferred are 4-hydroxy benzoic acid, 4-hydroxy-3-methoxy benzoic acid (vanillic acid) and 4-hydroxy-3,5-dimethoxy benzoic acid (syringic acid). Since these compounds can be obtained from lignin as a woody biomass, they can be acquired as renewable resources.

Examples of an antimony catalyst used in the present invention include antimony trioxide $Sb_2O_3$, antimony pentoxide $Sb_2O_5$, antimony acetate $Sb(CH_3COO)_3$, triphenyl antimony $Sb(C_6H_5)_3$ and antimony glycolate, among which antimony trioxide is particularly preferred.

It is preferred that the antimony catalyst be used in an amount of $1\times10^{-6}$ to $1\times10^{-2}$ mol, particularly $1\times10^{-3}$ to $1\times10^{-2}$ mol, per 1 mol of the compound represented by the general formula (1).

The compound represented by the general formula (1) is polymerized in two steps in the production method of the invention.

In a first step, the compound represented by the general formula (1) is heated at a heating temperature in a range of from a melting point of this compound to a temperature that is 10° C. higher than such melting point, under the presence of the antimony catalyst. It is preferred that the polymerization reaction in the first step be performed under ordinary pressure; and an inert atmosphere such as a nitrogen gas atmosphere and an argon gas atmosphere. Polymerization of the compound represented by the general formula (1) progresses in the first step, which causes the viscosity of a melted product to gradually increase. The first step will be completed when the melted product has solidified or when the viscosity of the melted product has significantly increased. The reaction time in the first step is normally about 1 to 24 hours.

In a succeeding second step, a solid product or viscous product that has been obtained through the progression of polymerization in the first step will be further heated. A polymerization temperature in the second step is not lower than the melting point of the compound represented by the general formula (1), and not higher than 270° C. It is particularly preferred that such polymerization temperature be a temperature that is as low as possible, but at which the reactant can be maintained in a molten state. When the polymerization temperature in the second step is excessively high, a polymer produced may be thermally decomposed. Therefore, in order to obtain a high-molecular-weight polymer, it is preferred that polymerization be performed under a mild condition and a temperature that is as low as possible, but at which the polymer produced is allowed to remain melted.

This temperature varies depending on the monomer compound represented by the general formula (1). For example, when Z in the general formula (1) is a trimethylene group, it is preferred that the polymerization temperature in the second step be 190 to 230° C., particularly preferably 200 to 220° C.; and when Z is a tetramethylene group, it is preferred that the polymerization temperature in the second step be 140 to 210° C., more preferably 150 to 200° C., and particularly preferably 160 to 190° C. The temperature in the reaction system is gradually raised to the polymerization temperature in the second step, and the pressure in the reaction system is gradually reduced from ordinary pressure. It is preferred that the pressure in the reaction system at that moment be not higher than 50 Pa, more preferably not higher than 30 Pa, and particularly preferably not higher than 10 Pa. A reaction time in the second step is normally about 6 to 24 hours.

Polyester

A polyester obtained through the method of the present invention is represented by the following general formula (2).

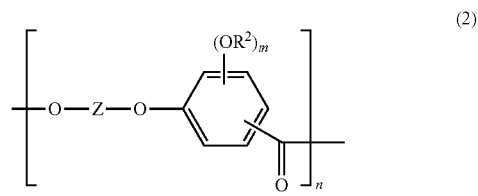

[In the general formula (2), Z, $R^2$ and m are defined as above in the general formula (1); and n represents an average repeating unit number satisfying n=10 to 600.]

The value of n in the general formula (2) can be calculated based on the molecular weight of the polyester obtained through the production method of the invention. The molecular weight of the polyester can be calculated as a number average molecular weight in terms of polystyrene, through liquid chromatography measurement. An average value of n can then be calculated from such number average molecular weight.

It is preferred that n be a number of 50 to 400, more preferably 100 to 350.

WORKING EXAMPLE

The invention of the present application is described in greater detail hereunder with reference to synthesis and working examples. However, the invention of the present application is not limited to the following examples.

Reagent

Reagents that were used in synthesis and working examples are as follows.

Vanillic acid (4-hydroxy-3-methoxybenzoic acid, 95.0%) by Wako Pure Chemical Industries, Ltd.

Sodium iodide (sodium iodide, 99.5%) by Wako Pure Chemical Industries, Ltd.

3-Chloro-1-propanol (3-chloro-1-propanol) by Tokyo Chemical Industry Co., Ltd.

4-Chlorobutyl acetate (acetic acid 4-chlorobutyl ester, 97.0%) by Tokyo Chemical Industry Co., Ltd.

Potassium hydroxide (potassium hydroxide, 86%) by KANTO CHEMICAL CO., INC.

Potassium carbonate (potassium carbonate, 99.5%) by Wako Pure Chemical Industries, Ltd.

Ethanol (ethanol, 99.5%) by Tokyo Chemical Industry Co., Ltd.

N,N-Dimethylformamide, DMF (N,N-dimethylformamide, 99.5%) by KANTO CHEMICAL CO., INC.

Tetraisopropyl orthotitanate or titanium (IV) tetraisopropoxide (titanium (IV) tetraisopropoxide, 97.0%) by KANTO CHEMICAL CO., INC.

Antimony trioxide (III) (antimony oxide, 99.9%) by Wako Pure Chemical Industries, Ltd.

Synthesis of Monomer

Synthesis Example 1 (synthesis of 4-(3-hydroxypropoxy)-3-methoxy benzoic acid)

10 g of vanillic acid (59.5 mmol), 8.8 g of potassium hydroxide (156.8 mmol) and 1.35 g of sodium iodide (9.0 mmol) were put into a 300 mL eggplant-shaped flask, followed by adding 50 mL of an ultrapure water thereto, and then stirring the contents at room temperature so as to dissolve them. Such reaction container was later placed in an oil bath, and 8.0 g of 3-chloro-1-propanol (84.6 mmol) was then slowly delivered into the container by drops while stirring the contents therein with the oil bath being heated to 80° C. Next, the temperature of the oil bath was raised to about 100 to 120° C., and the reaction mixed solution was refluxed for 24 hours. Then, the reaction container was placed in an ice bath to be cooled, and 50 mL of 1N-HCl was further added to the container while performing stirring, thereby acidifying the solution (not greater than pH 2). A precipitate produced was then collected through filtration, followed by performing purification through recrystallization in 100 mL of an ethanol/water (1:1) mixed solution, thus obtaining a white needle crystal at a yield of 5.5 g (41%). The melting point of the product obtained was 162° C.

Synthesis Example 2 (synthesis of 4-(4-hydroxybutoxy)-3-methoxy benzoic acid)

8.4 g of vanillic acid (50 mmol) and 20.7 g of potassium carbonate (150 mmol) were put into a 300 mL three-neck flask equipped with a nitrogen introducing pipe and a cooler, followed by adding 80 mL of DMF thereto, and then stirring the contents under a nitrogen atmosphere and room temperature so as to dissolve them. Such reaction container was later placed in an ice bath, and 9.0 g of 4-chlorobutyl acetate (60 mmol) was then slowly delivered into the container by drops while stirring the contents therein. An oil bath was then used to react the contents at 80° C. for 24 hours. Next, the reaction container was placed in an ice bath to be cooled, followed by adding to the container 100 mL of water and then 50 mL of 1N-HCl while performing stirring, thereby acidifying the solution (not greater than pH 2). This mixed solution was then washed three times using 20 mL of chloroform. After collecting an organic phase therefrom, the solution was further washed with 50 mL of water, then with 50 mL of a saturated aqueous solution of sodium hydrogen carbonate, and finally with another 50 mL of water. Later, a rotary evaporator was used to distill away the solvents, and a viscous liquid obtained was then dissolved in 100 mL of a 2M-NaOH/water (1:1) solution. A mixed solution thus obtained was then refluxed at 80° C. for two hours using an oil bath, followed by cooling the same in an ice bath. 100 mL of water and then 100 mL of 1N-HCl were later added to the cooled solution so as to acidify the same (not greater than pH 2). A precipitate produced was then collected through filtration, followed by performing purification through recrystallization in 100 mL of an ethanol/water (1:1) mixed solution, thus obtaining a white needle crystal at a yield of 4.1 g (34%). The melting point of the product obtained was 150° C.

Synthesis of Polymer

Working Example 1 (polymerization of 4-(3-hydroxypropoxy)-3-methoxy benzoic acid)

The 4-(3-hydroxypropoxy)-3-methoxy benzoic acid obtained in the synthesis example 1 was taken by an amount of 0.11 g (0.50 mmol), and was put into a reaction container. The pressure in the reaction system was reduced, and an operation of introducing nitrogen was then repeated three times. 0.15 mg of antimony trioxide ($1 \times 10^{-3}$ mol per 1 mol of monomer) was then added to such reaction container as a polymerization catalyst, followed by heating the contents to 170° C. under a nitrogen atmosphere and ordinary pressure so as to melt the monomer. The reaction was performed for an hour under such condition.

Later, the temperature in the reaction system was gradually raised to 210° C., and 30 min was spent in gradually reducing the pressure in the system to 30 Pa or lower. After reducing the pressure in the reaction container, the contents therein were further left to react for 24 hours so as to obtain a solid product. The solid product thus obtained was then dissolved in chloroform. Such chloroform with the solid product dissolved therein was further poured into diethyl ether to obtain a white precipitate (at a yield of 0.08 g (76%)).

Working Example 2 (polymerization of 4-(4-hydroxybutoxy)-3-methoxy benzoic acid)

The 4-(4-hydroxybutoxy)-3-methoxy benzoic acid obtained in the synthesis example 2 was taken by an amount of 0.12 g (0.50 mmol), and was put into a reaction container. The pressure in the reaction system was reduced, and an operation of introducing nitrogen was then repeated three times. Antimony trioxide of 0.15 mg ($1 \times 10^{-3}$ mol per 1 mol of monomer) was then added to such reaction container as a polymerization catalyst, followed by heating the contents to 160° C. under a nitrogen atmosphere and ordinary pressure so as to melt the monomer. The reaction was performed for three hours under such condition.

Later, the temperature in the reaction system was gradually raised to 190° C., and 30 min was spent in gradually reducing the pressure in the system to 30 Pa or lower. After reducing the pressure in the reaction container, the contents therein were further left to react for 24 hours so as to obtain a solid product. The solid product thus obtained was then dissolved in chloroform. Such chloroform with the solid product dissolved therein was further poured into diethyl ether to obtain a white precipitate (at a yield of 0.05 g (41%)).

Comparative Example 1

A white precipitate (yield of 0.018 g (19%)) was obtained in a similar manner as the working example 2, except that the reaction temperature in the first step was set to 170° C., and the reaction time in such first step was set to an hour; and that the reaction temperature in the second step was set to 210° C., and the reaction time in the second step was set to six hours.

Comparative Example 2

The 4-(3-hydroxypropoxy)-3-methoxy benzoic acid obtained in the synthesis example 1 was taken by an amount of 0.10 g (0.45 mmol), and was put into a reaction container. The pressure in the reaction system was reduced, and an operation of introducing nitrogen was then repeated three times. Tetraisopropyl orthotitanate of 0.14 mg ($1 \times 10^{-3}$ mol per 1 mol of monomer) was then added to such reaction container as a polymerization catalyst, followed by heating the contents to 170° C. under a nitrogen atmosphere and ordinary pressure so as to melt the monomer. The reaction was performed for an hour under such condition.

Later, the temperature in the reaction system was gradually raised to 210° C., and 30 min was spent in gradually reducing the pressure in the system to 30 Pa or lower. After reducing the pressure in the reaction container, the contents therein were further left to react for 24 hours so as to obtain a solid product. The solid product thus obtained was then dissolved in chloroform. Such chloroform with the solid product dissolved therein was further poured into diethyl ether to obtain a precipitate (at a yield of 0.071 g (76%)). The precipitate was colored in brown.

Evaluation of Product

The number average molecular weight (Mn), weight-average molecular weight (Mw) and polydispersity index (PDI) of each polymer obtained in the working examples 1 and 2, and the comparative examples 1 and 2, were measured by a liquid chromatography device manufactured by Shimadzu Corporation, where a sample solution obtained by dissolving 1 mg of a polymer sample into 1 mL of chloroform was used. Chloroform was used as an eluent, and a differential refractometer (RI) was used as a detector. The measurements were performed at a flow rate of 0.8 mL/min and a temperature of 40° C., and used as a standard substance was a polystyrene having a known molecular weight.

The glass-transition temperature (Tg), melting point (Tm) and crystallization temperature (Tc) of each polymer obtained in the working examples 1 and 2, and the comparative examples 1 and 2, were measured by DSC 8230L manufactured by PerkinElmer Co., Ltd., at a heating rate of 10° C./min in a 2nd run.

The 5% weight reduction temperature (Td5%) of each polymer obtained in the working examples 1 and 2, and the comparative examples 1 and 2, was measured by TG-DTA 7200 manufactured by Hitachi High-Tech Science Corporation, at a heating rate of 20° C./min.

These results are summarized in Table 1.

through the method of the present invention were polymers with favorable crystallinities in a sense such that they had exhibited crystallization temperatures $T_c$ and crystallization enthalpies $\Delta H_c$ that were higher than those of the polymers produced using the titanium catalyst. Further, it also became clear that the polymers obtained through the method of the present invention had exhibited high 5% weight reduction temperatures i.e. superior heat resistances.

INDUSTRIAL APPLICABILITY

Established was a method for producing a non-colored polyester having a high molecular weight. Particularly, since 4-hydroxy benzoic acid, 4-hydroxy-3-methoxy benzoic acid (vanillic acid) and 4-hydroxy-3,5-dimethoxy benzoic acid (syringic acid) that can be used as raw materials of monomers can be obtained from lignin as a woody biomass, they can be acquired as renewable resources. Polyesters obtained from these compounds serve as bio-based plastics superior in crystallinity and heat resistance, and can thus be used in various fields such as those producing films, containers and fibers.

The invention claimed is:

1. A method for producing a polyester represented by general formula (2) comprising:
a first step of heating, under the presence of an antimony catalyst, a compound represented by the following general formula (1) at a heating temperature in a range of from a melting point of the compound to a temperature that is 10° C. higher than the melting point

TABLE 1

| | Polymer color | $M_n$ (g/mol) | $M_w$ (g/mol) | PDI | $T_g$ (° C.) | $T_m$ (° C.) | $\Delta H_m$ (J/g) | $T_c$ (° C.) | $\Delta H_c$ (J/g) | $T_{d5\%}$ (° C.) |
|---|---|---|---|---|---|---|---|---|---|---|
| Working example 1 | White | 25,000 | 42,500 | 1.70 | 62.1 | 201 | 41 | 159 | 48 | 389 |
| Working example 2 | White | 78,300 | 148,400 | 1.90 | 46.5 | 135 | 8 | — | — | 390 |
| Comparative example 1 | White | 6,300 | 17,800 | 2.84 | 42.1 | 140 | 47 | — | — | 368 |
| Comparative example 2 | Brown | 20,900 | 40,300 | 1.94 | 62.1 | 196 | 49 | 135 | 41 | 358 |

It became clear that there could be obtained a non-colored high-molecular-weight polymer by using an antimony catalyst to perform polymerization, and by controlling the polymerization temperature. The coloring of a polymer due to the conventional usage of a titanium catalyst has been a problem.

Particularly, according to the results of the comparative example 1, it became clear that there could only be produced a polymer with a low molecular weight and a low heat resistance when the polymerization temperature was out of the range of the present invention, even if an antimony catalyst was used.

Further, according to the results of the comparative example 2, it became clear that the polymers obtained

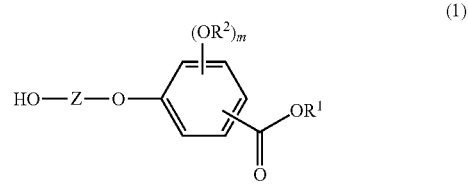

(1)

wherein Z represents a divalent hydrocarbon group having 1 to 12 carbon atoms;
$R^1$ represents a hydrogen atom, an alkyl group having 1 to 6 carbon atoms, or a phenyl group;
$R^2$ represents a methyl group or an ethyl group; and
m represents an integer of 0 to 2; and a second step of heating a solid product or viscous product obtained after the first step at a heating temperature in a range of from the melting point of the compound represented by the general formula (1) to 270° C., and wherein in the following general formula (2)

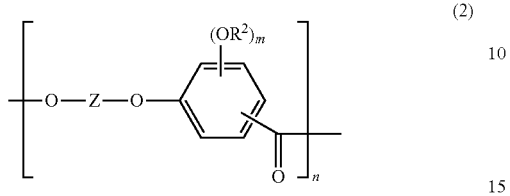

Z, $R^2$ and m are defined as above in the general formula (1); and n represents an average repeating unit number satisfying n=10 to 600.

2. The method for producing the polyester according to claim 1, wherein Z in the general formula (1) is an alkylene group represented by $(CH_2)_p$, wherein p represents 3 or 4.

3. The method for producing the polyester according to claim 2, wherein the heating temperature in the second step is 140 to 220° C.

4. A polyester produced by the method described in claim 1.

* * * * *